No. 822,638. PATENTED JUNE 5, 1906.
G. J. VESTER.
SALT SHAKER.
APPLICATION FILED SEPT. 11, 1905.
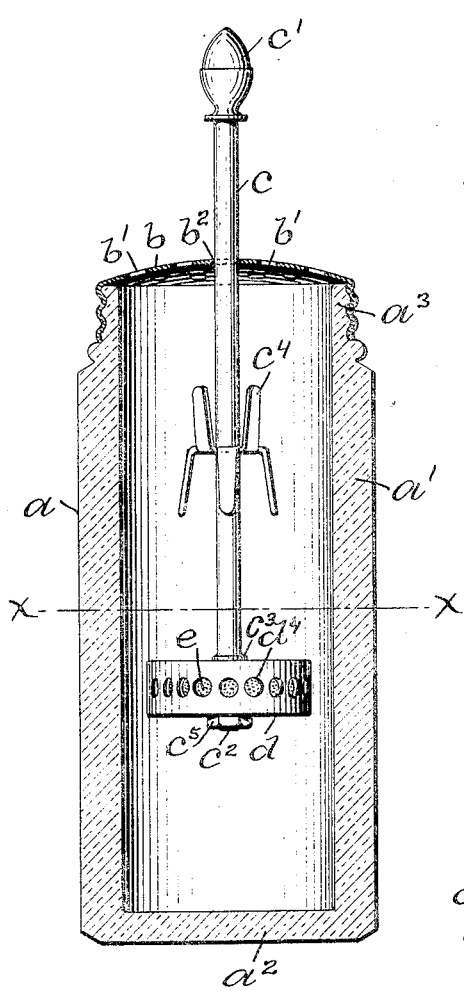
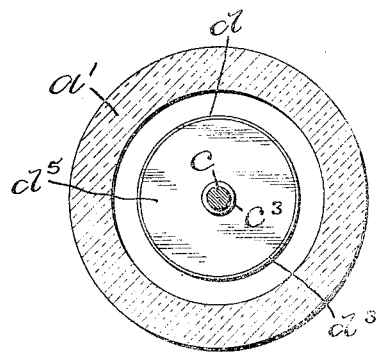
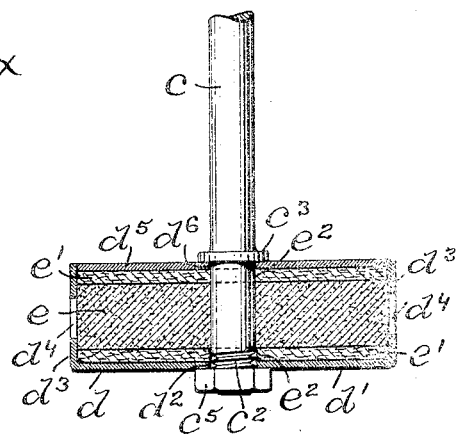
WITNESSES
Ada E. Hagerty.
Chas. H. Luther.
INVENTOR
Gustave J. Vester
By Joseph A. Miller
ATTORNEY.

UNITED STATES PATENT OFFICE.

GUSTAVE J. VESTER, OF PROVIDENCE, RHODE ISLAND.

SALT-SHAKER.

No. 822,638. Specification of Letters Patent. Patented June 5, 1906.

Application filed September 11, 1905. Serial No. 277,920.

*To all whom it may concern:*

Be it known that I, GUSTAVE J. VESTER, a citizen of the United States, residing at Providence, in the county of Providence and State of Rhode Island, have invented a new and useful Improvement in Salt-Shakers, of which the following is a specification.

This invention has reference to an improvement in salt-shakers whereby excessive moisture is eliminated from the salt in the shaker.

In the use of salt-shakers as heretofore constructed the salt in the shaker would readily collect dampness or moisture from the atmosphere, which, causing the grains of salt to adhere together or form into a compactness, would prevent the same from being properly shaken from the shaker.

The object of my invention is to eliminate excessive moisture from the salt in the shaker, whereby the salt is held in a granular or dry condition and may be readily shaken from the shaker.

Figure 1 is a sectional view taken vertically through my improved salt-shaker. Fig. 2 is a transverse sectional view taken on line X X of Fig. 1 through the salt-shaker, and Fig. 3 is an enlarged detail sectional view taken vertically through the perforated box inclosing the absorbent material.

In the drawings, $a$ indicates the receptacle for the salt; $b$, the perforated screw-cap; $c$, the rod, and $d$ the perforated box inclosing the absorbent material $e$ of my improved salt-shaker.

The receptacle $a$ may be of any design or configuration desired. In the preferred form I use a cylindrical body $a'$, (of glass or other material,) having the closed bottom $a^2$ and the screw-threaded open top $a^3$. The cap $b$ has the usual perforations $b'\ b'$ and the central hole $b^2$ and is constructed to screw onto the open screw-threaded end $a^3$ of the body $a'$ in the usual way, as shown in Fig. 1.

The rod $c$ has the knob $c'$ on its upper end, the screw-threaded lower end $c^2$ and the collar $c^3$ adjacent the lower end, as shown in Figs. 1 and 3. This rod extends centrally into the body $a'$ of the shaker through the central hole $b^2$ in the cap $b$. An agitator $c^4$ may be secured to the rod $c$ intermediate the cap $b$ and the box $d$, as shown in Fig. 1.

The box $d$ is circular in the preferred form and constructed to have the bottom $d'$, in which is the central hole $d^2$, the upwardly-extending circular edge $d^3$, in which is the series of holes $d^4\ d^4$, and the cover $d^5$, having the central hole $d^6$ and shaped to fit in the open top of the box, as shown in Fig. 3.

The absorbent material $e$ may consist of any absorbent substance having a greater absorbing quality than salt. In the preferred form I use corn-starch and blotting-paper. A disk of blotting-paper $e'$, having the central hole $e^2$, is placed in the bottom of the box $d$ and the box filled with corn-starch. A disk $e'$, of blotting-paper, having the central hole $e^2$, is now placed on the corn-starch, the cover $d^5$ placed on the disk of blotting-paper, and the box secured to the lower end of the rod $c$ by passing the lower end of the rod through the holes in the cover, disks of blotting-paper, corn-starch, and the hole in the bottom of the box, where it is secured by the nut $c^5$. By tightening the nut $c^5$ the cover $d^5$ is drawn into the box, compressing the corn-starch between the disks of blotting-paper, as shown in Fig. 3.

The absorbent material $e$ may be easily renewed, if required, by removing the box $d$ from the rod $c$, or the moisture in the absorbent material may be eliminated when the salt-shaker is not in use by placing the box $d$ in an oven or similar heating device.

In the use of my improved salt-shaker the box $d$, with the absorbent material, is placed in the shaker, which is now filled with salt, and the perforated cap $b$ secured by screwing it onto the upper end of the shaker, as shown in Fig. 1. The absorbent material in the box $d$ now extracts and absorbs all excessive moisture from the salt through the series of holes $d^4\ d^4$ in the edge $d^3$ of the box, thus leaving the salt in a dry granular condition. The salt may now be readily shaken through the perforations in the cap $b$ when required.

Having thus described my invention, I claim as new and desire to secure by Letters Patent—

1. In a salt-shaker, a receptacle, a rod projecting within said receptacle and formed with a threaded lower end, a collar on said rod spaced from said lower end, a box having an opening in its bottom to receive said rod, said box having perforations in its sides, compressible absorbent material in said box, a cover formed with an opening receiving said rod and abutting said collar, and extending within said box to engage said compressible material, and a nut on said threaded end of the rod to engage and support said box and to enable adjustment of the degree of compressibility of said absorbent material.

2. In a salt-shaker, a receptacle, a rod projecting within said receptacle and formed with a threaded lower end, a collar on said rod spaced from said end, a box having an opening in its bottom to receive said rod, said box having perforations formed in its side, a section of blotting-paper seating in the box-bottom, corn-starch packed on top of said blotting-paper, a second section of blotting-paper seating on top of said corn-starch, a cover formed with an opening to receive said rod and abutting said collar and extending within said box to engage said second section of blotting-paper, and a nut on said threaded end of the rod to engage and support said box and enabling the compactness of said corn-starch to be regulated.

In testimony whereof I have signed my name to this specification in the presence of two subscribing witnesses.

GUSTAVE J. VESTER.

Witnesses:
 ADA E. HAGERTY,
 J. A. MILLER.